United States Patent
Takeuchi et al.

(10) Patent No.: US 10,712,598 B2
(45) Date of Patent: Jul. 14, 2020

(54) DISPLAY APPARATUS

(71) Applicant: SHARP KABUSHIKI KAISHA, Sakai, Osaka (JP)

(72) Inventors: Hidefumi Takeuchi, Sakai (JP); Tadaaki Yoshikane, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/184,759

(22) Filed: Nov. 8, 2018

(65) Prior Publication Data
US 2019/0146264 A1    May 16, 2019

(30) Foreign Application Priority Data

Nov. 10, 2017  (JP) .................................. 2017-217074

(51) Int. Cl.
*G02F 1/1333*  (2006.01)
*F21V 8/00*  (2006.01)

(52) U.S. Cl.
CPC ..... *G02F 1/133308* (2013.01); *G02B 6/0013* (2013.01); *G02F 2001/133311* (2013.01); *G02F 2001/133331* (2013.01)

(58) Field of Classification Search
CPC .......... G02F 2001/13328; G02F 2001/133331; G02F 2001/133317; G02F 2001/133311
See application file for complete search history.

(56) References Cited

U.S. PATENT DOCUMENTS

| | | | |
|---|---|---|---|
| 2013/0051071 A1* | 2/2013 | Lee .................... | G02F 1/133308 362/611 |
| 2014/0028948 A1* | 1/2014 | Hsiao ................ | G02F 1/133308 349/58 |
| 2014/0063402 A1* | 3/2014 | Chen ...................... | G02B 6/009 349/58 |
| 2015/0055053 A1* | 2/2015 | Sasaoka ............ | G02F 1/133308 349/58 |
| 2015/0253612 A1* | 9/2015 | Hasegawa ......... | G02F 1/133308 349/58 |
| 2016/0377908 A1* | 12/2016 | Shin .................. | G02F 1/133308 349/58 |

FOREIGN PATENT DOCUMENTS

WO    2014/050138 A1    4/2014

\* cited by examiner

*Primary Examiner* — Jessica M Merlin
(74) *Attorney, Agent, or Firm* — ScienBiziP, P.C.

(57) ABSTRACT

A display apparatus includes a display unit, a support, a cover member, and a first interposition member. The display unit displays an image. The support supports the display unit. The cover member is disposed with a gap between the cover member and the display unit and covers the display unit. The first interposition member is interposed between the support and the cover member, and is in contact with the support and the cover member. The first interposition member has elasticity and thermal conductance.

9 Claims, 15 Drawing Sheets

DISPLAY APPARATUS

BACKGROUND

1. Field

The present disclosure relates to a display apparatus.

2. Description of the Related Art

A display apparatus described in International Publication No. 2014/050138 includes a display panel, a cover glass, and a frame-shaped spacer. The cover glass is disposed in front of a front surface of the display panel. The spacer secures the display panel and the cover glass with a predetermined distance therebetween. Air in a space (hereinafter, referred to as "space S") formed by the display panel, the cover glass, and the spacer is replaced with dry air having a low dew point temperature, thereby the space S being set to a dry state. As a result, an occurrence of dew condensation on an inner surface of the cover glass due to a change in an environment in which the display apparatus is placed can be reduced.

However, in the display apparatus described in International Publication No. 2014/050138, there is a possibility that dry air leaks from the space S or outside air intrudes into the space S due to aging. Therefore, a period during which the occurrence of dew condensation can be effectively reduced may be shortened.

It is desirable to provide a display apparatus in which occurrence of dew condensation can be effectively reduced over a relatively long period.

SUMMARY

According to an aspect of the disclosure, a display apparatus includes a display unit, a support, a cover member, and a first interposition member. The display unit displays an image. The support supports the display unit. The cover member is disposed with a gap between the cover member and the display unit and covers the display unit. The first interposition member is interposed between the support and the cover member, and is in contact with the support and the cover. The first interposition member has elasticity and thermal conductance.

DESCRIPTION OF THE EMBODIMENTS

Figure 1:
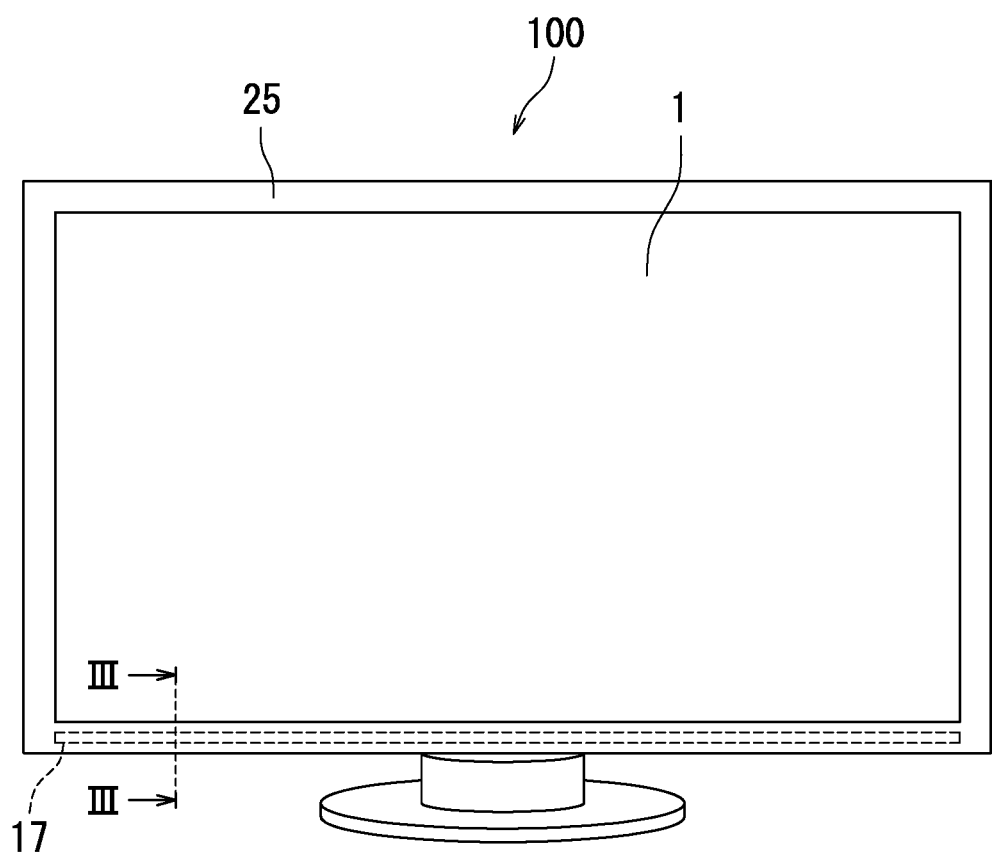
FIG. 1 is a front view illustrating a display apparatus according to Embodiment 1 of the disclosure.

Hereinafter, embodiments of the disclosure are described with reference to the drawings. The same reference numerals are given to the same or corresponding portions and description thereof is not repeated. In addition, in the embodiments, an X-axis and a Y-axis are substantially parallel to a horizontal direction, a Z-axis is substantially parallel to a vertical direction, and the X-axis, the Y-axis, and the Z-axis are orthogonal to each other.

Embodiment 1

A display apparatus 100 according to Embodiment 1 of the disclosure is described with reference to FIGS. 1 to 10. First, an appearance of the display apparatus 100 is described with reference to FIG. 1. FIG. 1 is a front view illustrating the display apparatus 100. As illustrated in FIG. 1, the display apparatus 100 displays an image. In this specification, the image may be a moving image or a still image. The display apparatus 100 for example, an information display.

The display apparatus 100 includes a cover member 1. The cover member 1 transmit light. The cover member 1 has a substantially rectangular shape. The cover member is made of, for example, class or synthetic resin. The color of the cover member 1 is a transparent color. The cover member 1 may be a colorless transparent member or a colored transparent member. In addition, a touch panel (not illustrated) may be provided on a front surface of the cover member 1 having the front surface and a back surface. Furthermore, it is preferable that the cover member 1 has a black region 25. The black region 25 is positioned on the back surface of the cover member 1. The black region 25 has a substantially rectangular ring shape and is provided along an outer edge of the cover member 1.

Figure 2:
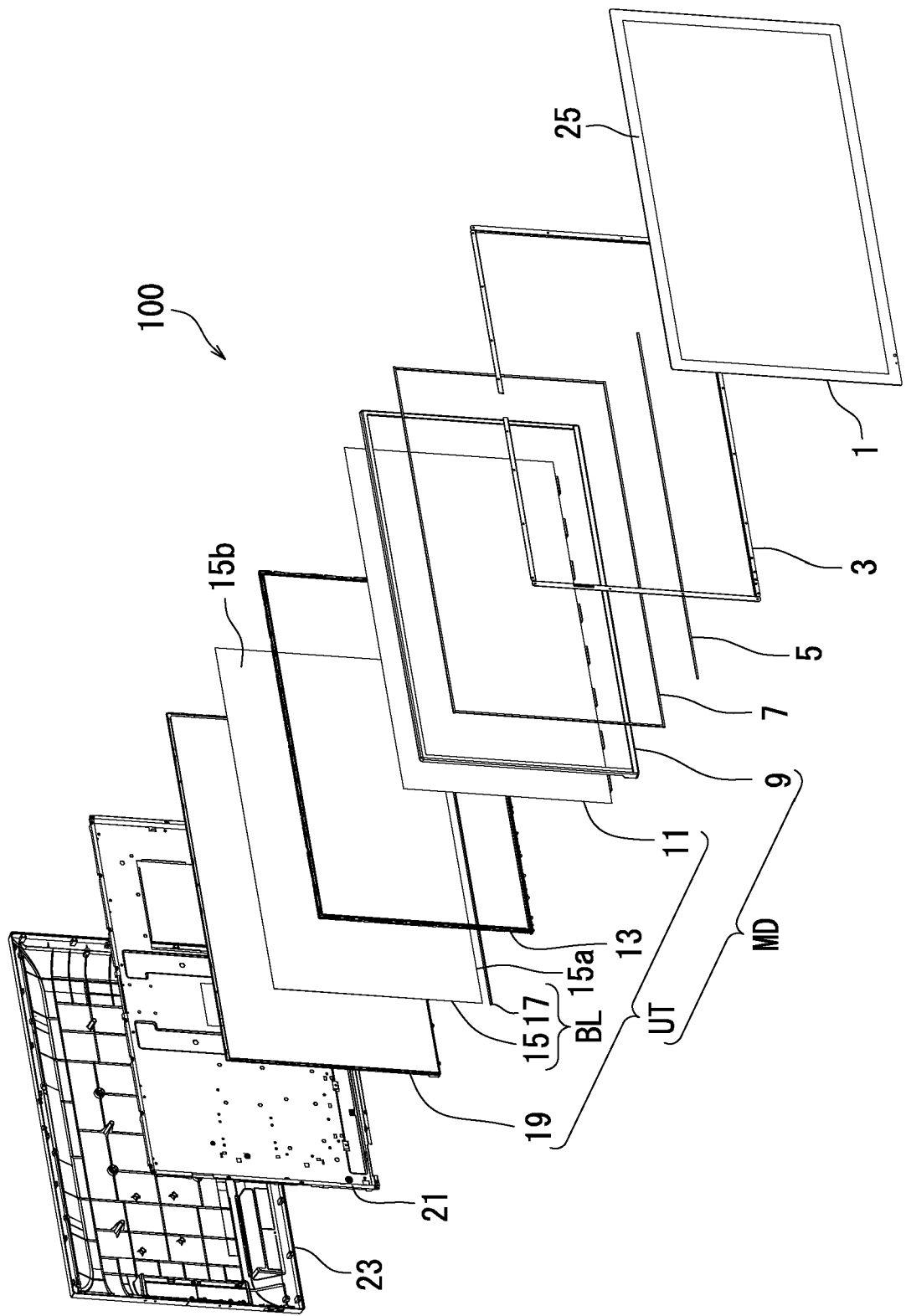
FIG. 2 is an exploded perspective view illustrating the display apparatus according to Embodiment 1.

Next, an entire configuration of the display apparatus 100 is described with reference to FIG. 2. FIG. 2 is an exploded perspective view illustrating the display apparatus 100. As illustrated in FIG. 2, the display apparatus 100 further includes a cover holding member 3, a first interposition member 5, a display module MD, a tray 21, and a back cabinet 23, in addition to the cover member 1. It is preferable that the display apparatus 100 further includes a second interposition member 7. In FIG. 2, in order to simplify the drawing, various circuits and various boards for controlling and driving the display apparatus 100 are not illustrated.

The cover member 1 covers the display module MD. The cover holding member 3 holds the cover member 1. The cover holding member 3 is attached to the tray 21. The cover holding member 3 has a substantially rectangular ring shape of which a part is opened. The cover holding member 3 is made of, for example, metal. The first interposition member 5 is interposed between the display module MD and the cover member 1. The first interposition member 5 has a substantially linear shape. The second interposition member 7 is interposed between the display module MD and the cover member 1. The second interposition member 7 has a substantially rectangular ring shape.

The display module MD displays an image. The display module MD is attached to the tray 21. The tray 21 has a substantially rectangular shape and has a substantially shallow dish shape. The tray 21 is made of, for example, metal. The tray 21 faces the back cabinet 23 and is attached to the back cabinet 23. The back cabinet 23 has a substantially rectangular shape and has a substantially shallow dish shape. The back cabinet 23 is made of, for example, synthetic resin.

The display module MD includes a display unit UT and a support 9. The display unit UT displays an image. The cover member 1 covers the display unit UT. The support 9 supports the display unit UT. The support 9 has a substantially rectangular ring shape. The support 9 is, for example, a bezel. The support 9 is made of, for example, metal or synthetic resin.

The display unit UT includes a display panel 11, a panel chassis 13, an edge-light backlight BL, and a backlight chassis 19. Moreover, the display unit UT may include an optical sheet disposed to face the display panel 11.

The display panel 11 displays an image. In Embodiment 1, the display panel 11 is a liquid crystal panel. The display panel 11 faces the cover member 1 and has a substantially rectangular shape. The panel chassis 13 supports the display panel 11. Specifically, the panel chassis 13 and the support 9 sandwich the display panel 11. The panel chassis 13 has a substantially rectangular ring shape. The panel chassis 13 is made of, for example, synthetic resin.

The backlight BL illuminates the display panel 11 from a back surface side of the display panel 11. Specifically, the backlight BL includes a light guide 15 and a light source 17. The light guide 15 has a substantially rectangular shape and a substantially flat plate shape. The light guide 15 faces the display panel 11. The light guide 15 has an entrance surface 15a and an exit surface 15b. The entrance surface 15a is an end surface corresponding to one side among four sides of the light guide 15. The light guide 15 has a pair of main surfaces and the exit surface 15b is the main surface facing the display panel 11. The light guide 15 has a transparent color and is made of, for example, synthetic resin. The light source 17 extends substantially linearly. The light source 17 faces the entrance surface 15a of the light guide 15. The light source 17 emits light toward the entrance surface 15a. The light guide 15 emits light from the exit surface 15b toward the display panel 11 while guiding the light incident from the entrance surface 15a.

The backlight chassis 19 supports the backlight BL. Specifically, the backlight chassis 19 and the panel chassis 13 sandwich the light guide 15. The backlight chassis 19 has a substantially rectangular shape. The backlight chassis 19 faces the tray 21 and is attached to the tray 21. The backlight chassis 19 is made of, for example, metal.

Figure 3:
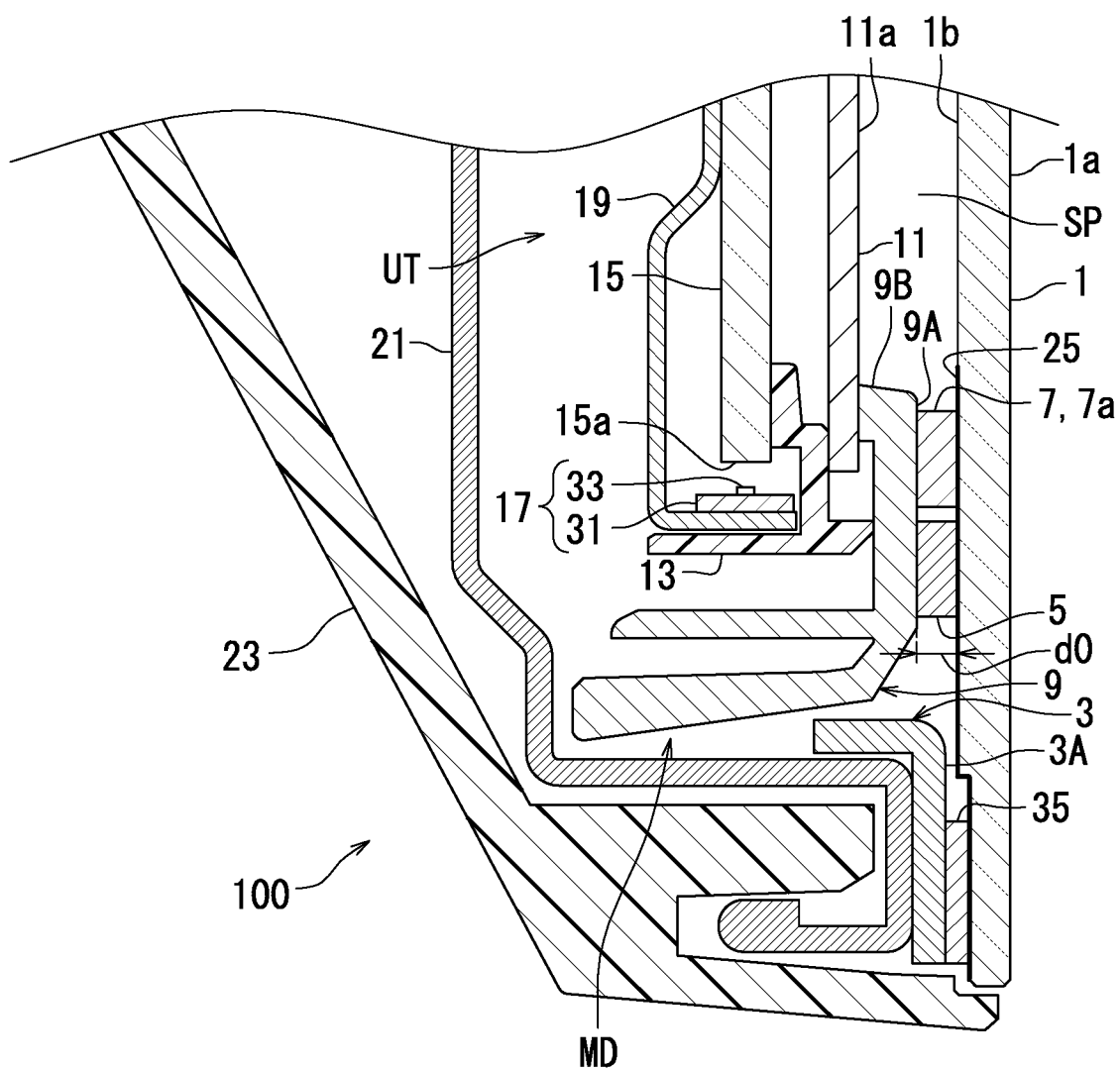
FIG. 3 is a sectional view taken along line III-III of FIG. 1.

Next, a sectional configuration of the display apparatus 100 is described with reference to FIG. 3. FIG. 3 is a sectional view taken along line III-III of FIG. 1. As illustrated in FIG. 3, the display apparatus 100 further includes a double-sided adhesive tape 35. The double-sided adhesive tape 35 has an adhesive on each of the pair of surfaces opposite each other. In this specification, "adhesion" includes "stickiness" and "adhesive" includes "sticking agent".

One surface of the double-sided adhesive tape 35 adheres to a front surface 3A of the cover holding member 3 and the other surface adheres to the back surface (for example, the black region 25) of the cover member 1. As a result, the cover member 1 is held by the cover holding member 3. The front surface 3A of the cover holding member 3 faces the back surface of the cover member 1 and is a substantially flat surface substantially parallel to the cover member 1.

The cover member 1 is disposed with a gap between the cover member 1 and the display unit UT. Specifically, the cover member 1 is disposed with a gap between the cover member 1 and the display panel 11. In addition, a front surface 9A of the support 9 and a back surface 1b of tree cover member 1 have a gap d0 therebetween. The front surface 9A of the support 9 faces the back surface 1b of the cover member 1 and is a substantially flat surface substantially parallel to the cover member 1.

The first interposition member 5 is disposed at a lower end portion in the display apparatus 100. The first interposition member 5 has elasticity and is interposed between the support 9 and the cover member 1. The first interposition member 5 is in contact with the support 9 and the cover member 1. Specifically, the first interposition member 5 is in contact with the front surface 9A of the support 9 and the back surface 1b (for example, the black region 25) of the cover member 1. More specifically, the first interposition member 5 is disposed on the front surface 9A of the support 9 and is pressed toward the support 9 by the back surface 1b of the cover member 1. As a result, the first interposition member 5 is in close contact with the back surface 1b of the cover member 1 and the front surface 9A of the support 9. The first interposition member 5 is positioned further outside than the second interposition member 7 with respect to the display panel 11. In addition, the first interposition member 5 is adjacent to the second interposition member 7 with a gap between the first interposition member 5 and the second interposition member 7.

The first interposition member 5 has thermal conductance. The thermal conductance means a property of easily transferring heat in a substance (specifically, in the first interposition member 5) from a high temperature region (specifically, the support 9) to a low temperature region the cover member 1). For example, the thermal conductance indicates that a thermal conductivity at room temperature (20° C.) is more than 0.5 Wm·K, the thermal conductivity at room temperature is preferably equal to or more than 1.0 W/m·K the thermal conductivity at room temperature is more preferably equal to or more than 2.0 W/m·K, and the thermal conductivity at room temperature is more preferably equal to or more than 3.0 W/m·K. Furthermore, the thermal conductance indicates that the thermal conductivity at room temperature is more preferably equal to or more than 4.0 W/m·K, the thermal conductivity at room temperature is more preferably equal to or more than 5.0 W/m·K, and the thermal conductivity at room temperature is more preferably equal to or more than 6.0 W/m·K.

The thermal conductivity may be measured by a steady state method or may be measured by an unsteady state method. The steady state method is, for example, a protective hot plate method (flat plate absolute method) or a concentric cylinder absolute method. The unsteady state method is, for example, a pulse heating method such as a flash method, a periodic heating method such as a calorimeter method, or a heat ray method such as a probe method.

The first interposition member 5 is formed of, for example, a silicone-based material (for example, silicone rubber) having thermal conductance or a non-silicone-based material (for example, organic synthetic rubber) having thermal conductance.

The second interposition member 7 is disposed at a lower end portion in the display apparatus 100. The second interposition member 7 has elasticity and is interposed between the support 9 and the cover member 1. The second interposition member 7 is in contact with the support 9 and the cover member 1. Specifically, the second interposition member 7 is in contact with the front surface 9A of the support 9 and the back surface 1b (for example, the black region 25) of the cover member 1. More specifically, the second interposition member 7 is disposed on the front surface 9A of the support 9 and is pressed toward the support 9 by the back surface 1b (for example, the black region 25) of the cover member 1. As a result, the second interposition member 7 is in close contact with the back surface 1b of the cover member 1 and the front surface 9A of the support 9. Since the second interposition member 7 has a substantially rectangular ring shape, the display apparatus 100 has a space SP surrounded by the second interposition member 7, the back surface 1b of the cover member 1, and a front surface 11a of the display panel 11. The second interposition member 7 is formed of, for example, rubber.

Part (specifically, the front surface 9A) of the support 9 is positioned between the first interposition member 5 and the light source 17. In addition, part (specifically, the front surface 9A) of the support 9 is positioned between the second interposition member 7 and the light source 17. The support 9 faces a side surface of the light source 17 with the panel chassis 13 in between.

The light source 17 is disposed at a lower end portion in the display apparatus 100. The light source 17 includes a substrate 31 and a plurality of light emitting elements 33. The plurality of light emitting elements 33 are mounted on the substrate 31. The plurality of light emitting elements 33 are disposed substantially linearly along the entrance surface 15a of the light guide 15 and face the entrance surface 15a. Each of the light emitting elements 33 emits light toward the entrance surface 15a. Each of the light emitting elements 33 is, for example, a light emitting diode (LED). In FIG. 3, one light emitting element 33 is shown.

The backlight chassis 19 faces the light guide 15 and supports the light guide 15. The light guide 15 is disposed with a gap between the light guide 15 and the display panel 11. In addition, the backlight chassis 19 supports the light source 17. The light source 17 is positioned inside the support 9.

As described above with reference to FIG. 3, according to Embodiment 1, the first interposition member 5 has thermal conductance and is in contact with the cover member 1 and the support 9. Therefore, heat generated by the heat source (specifically, the light source 17) easily moves from the support 9 to the cover member 1 through the first interposition member 5. As a result, a difference between a temperature in the vicinity of the heat source and a temperature of the cover member 1 is alleviated and it is possible to suppress occurrence of dew condensation on the back surface 1b of the cover member 1. In addition, as long as the first interposition member 5 is in contact with the support 9 and the cover member 1, heat can be effectively transferred from the support 9 to the cover member 1. As a result, as long as the first interposition member 5 is in contact with the support 9 and the cover member 1, it is possible to effectively reduce occurrence of dew condensation on the back surface 1b of the cover member 1 over a relatively long period.

In addition, according to Embodiment 1, it is possible to suppress an increase in manufacturing cost of the display apparatus 100 while reducing occurrence of dew condensation on the back surface 1b of the cover member 1.

Since occurrence of dew condensation can be reduced by only additionally disposing the first interposition member 5 in the display apparatus 100, it is possible to suppress an increase in manufacturing cost of the display apparatus 100 as compared to a case where occurrence of dew condensation is reduced by replacing air with dry air. That is, since a step for replacing air with dry air is unnecessary, it is possible to suppress the increase in manufacturing cost of the display apparatus 100.

With further reference to FIG. 3, the reason why occurrence of dew condensation can be reduced in Embodiment 1 is described while describing the cause of occurrence of dew condensation.

In a case where the first interposition member 5 is not provided, dew condensation occurs as follows. That is, when the display apparatus 100 operates, since the light source 17 generates heat, a temperature in the vicinity of the light source 17 rises. On the other hand, the front surface 1a of the cover member 1 is in contact with outside air. Therefore, when the display apparatus 100 operates, the temperature of the cover member 1 is lower than the temperature in the vicinity of the light source 17. That is, a difference occurs between the temperature of the cover member 1 and the temperature in the vicinity of the light source 17. Therefore, water vapor in the air of the space SP is a gas in the vicinity of the light source 17, but when the water vapor is in contact with the back surface 1b of the cover member 1, it is cooled by the cover member 1. As a result, in a high-humidity environment, the water vapor condenses and dew condensation occurs on the back surface 1b of the cover member 1. This is because the lower the temperature, the smaller the amount of saturated water vapor becomes.

Therefore, in Embodiment 1, the first interposition member 5 is provided to promote the transfer of heat from the support 9 to the cover member 1. The difference between the temperature in the vicinity of the light source 17, which can be regarded as a heat source, and the temperature of the cover member 1 is alleviated and the occurrence of dew condensation on the back surface 1b of the cover member 1 is suppressed.

Specifically, the first interposition member 5 is disposed so that part (specifically, the front surface 9A) of the support 9 is positioned between the first interposition member 5 and the light source 17. Therefore, the first interposition member 5 is disposed between the support 9 and the cover member 1 in the vicinity of the light source 17. That is, the first interposition member 5 is disposed at a place where dew condensation is likely to occur due to the temperature difference in the display apparatus 100. As a result, it is possible to effectively suppress the occurrence of dew condensation on the back surface 1b of the cover member 1. Particularly, since it is difficult to remove dew condensation generated on the back surface 1b of the cover member 1, reducing the occurrence of dew condensation beforehand is effective for improving the durability of the display apparatus 100.

In addition, in Embodiment 1, it is preferable that thermal conductivity of the first interposition member 5 indicates a value at which heat can be transferred from the support 9 to the cover member 1 so that the temperature of the back surface 1b of the cover member is higher than a dew point temperature of the air in contact with the back surface 1b of the cover member 1. With this, it is possible to further effectively suppress the occurrence of dew condensation on the back surface 1b of the cover member 1.

For example, it is preferable that thermal conductivity of the first interposition member 5 indicates a value at which heat can be transferred from the support 9 to the cover member 1 so that the temperature of a partial region of the back surface 1b of the cover member 1 is higher than the dew point temperature of the air in contact with the partial region of the back surface 1b of the cover member 1. A "partial region of the back surface 1b" of the cover member 1 indicates a region, in the entire region of the back surface 1b of the cover member 1, of which a temperature is changed by the heat generated in the heat source (specifically, the light source 17) if the first interposition member 5 is not provided.

Furthermore, as described with reference to FIG. 3, according to Embodiment 1, the heat generated by the light source 17 moves to the cover member 1 through the first interposition member 5. That is, the heat of the light source 17 can be dissipated (radiated). As a result, deterioration of the light source 17 (specifically, the light emitting elements 33) and reduction of light emission efficiency can be suppressed.

Furthermore, according to Embodiment 1, the first interposition member 5 is positioned further outside than the second interposition member 7. Therefore, it is difficult for heat to stay in the space SP as compared to a case where the first interposition member 5 is positioned further inside than the second interposition member 7. As a result, the temperature rise of the d splay panel 11 can be suppressed and the durability of the display panel 11 can be improved.

In addition, in Embodiment 1, it is preferable that a rebound resilience of the first interposition member 5 is lower than a rebound resilience of the second interposition member 7. That is, it is preferable that the first interposition member 5 has a low rebound resilience.

The rebound resilience is a ratio of repulsion energy to applied energy when a striking body (for example, a rigid ball) strikes a substance specifically, the first interposition member 5 or the second interposition member 7) with a specified mass and a specified speed. The applied energy indicates energy applied to the substance when the striking body strikes the substance. The repulsion energy indicates energy that the striking body has at repulsion the substance. Specifically, the rebound resilience is represented by a ratio of a highest height after repulsion of the striking body to a specified height when the striking body having a specified mass is dropped on the substance from a specified height.

If the first interposition member 5 has a low repulsion elasticity, when an external force acts on the cover member 1 from the outside of the display apparatus 100, the external force can be absorbed by the first interposition member 5. Therefore, for example, when an impact force as the external force acts on the cover member 1 during the transport of the display apparatus 100, the impact force can be alleviated. As a result, damage to the display apparatus 100 can be suppressed. The first interposition member 5 gradually restores to a shape before the external force acts after the external force ceased to act.

The first interposition member 5 having low repulsion elasticity is formed by, for example, a substance having viscoelasticity with less "elasticity" and more "viscosity". The low repulsion elasticity indicates, for example, that the rebound resilience is 15% or less, it is preferable that the rebound resilience is equal to or less than 10%, and it be more preferable that the rebound resilience is equal to or less than 5%. In addition, it is preferable that a hysteresis loss rate (JIS K 6400-2) of the first interposition member 5 is equal to or more than 50% and it is more preferable the hysteresis loss rate is equal to or more than 60%.

Furthermore, in Embodiment 1, it is preferable that flexibility of the first interposition member 5 is higher than flexibility of the second interposition member 7. That is, it is preferable that the first interposition member 5 has high flexibility. The flexibility is an index indicating softness of a substance (specifically, the first interposition member 5 or the second interposition member 7). The greater the flexibility, the softer the substance is. The fact that flexibility of the first interposition member 5 is higher than the flexibility of the second interposition member 7 indicates that, for example, hardness (for example, durometer hardness) of the first interposition member 5 is lower than hardness of the second interposition member 7.

If the first interposition member 5 has high flexibility, when the external force acts on the cover member 1 from the outside of the display apparatus 100, the external force can be absorbed by the first interposition member 5. Therefore, when the impact force as the external force acts on the cover member 1 during the transport of the display apparatus 100, the impact force can be alleviated. As a result, damage to the display apparatus 100 can be suppressed.

Furthermore, in Embodiment 1, it is preferable that the first interposition member 5 adheres to the cover member 1 and/or the support 9 by the adhesive. This is because "positional deviation" of the cover member 1 with respect to the display panel 11 can be suppressed. For example, it is possible to suppress the "positional deviation" of the cover member 1 during assembly work of the display apparatus 100 in a state of being disposed substantially horizontally. As a result, accuracy in assembly of the display apparatus 100 can be improved. For example, when the display apparatus 100 stands (FIG. 1), the "positional deviation" by its own weight of the cover member 1 can be suppressed.

Figure 4:
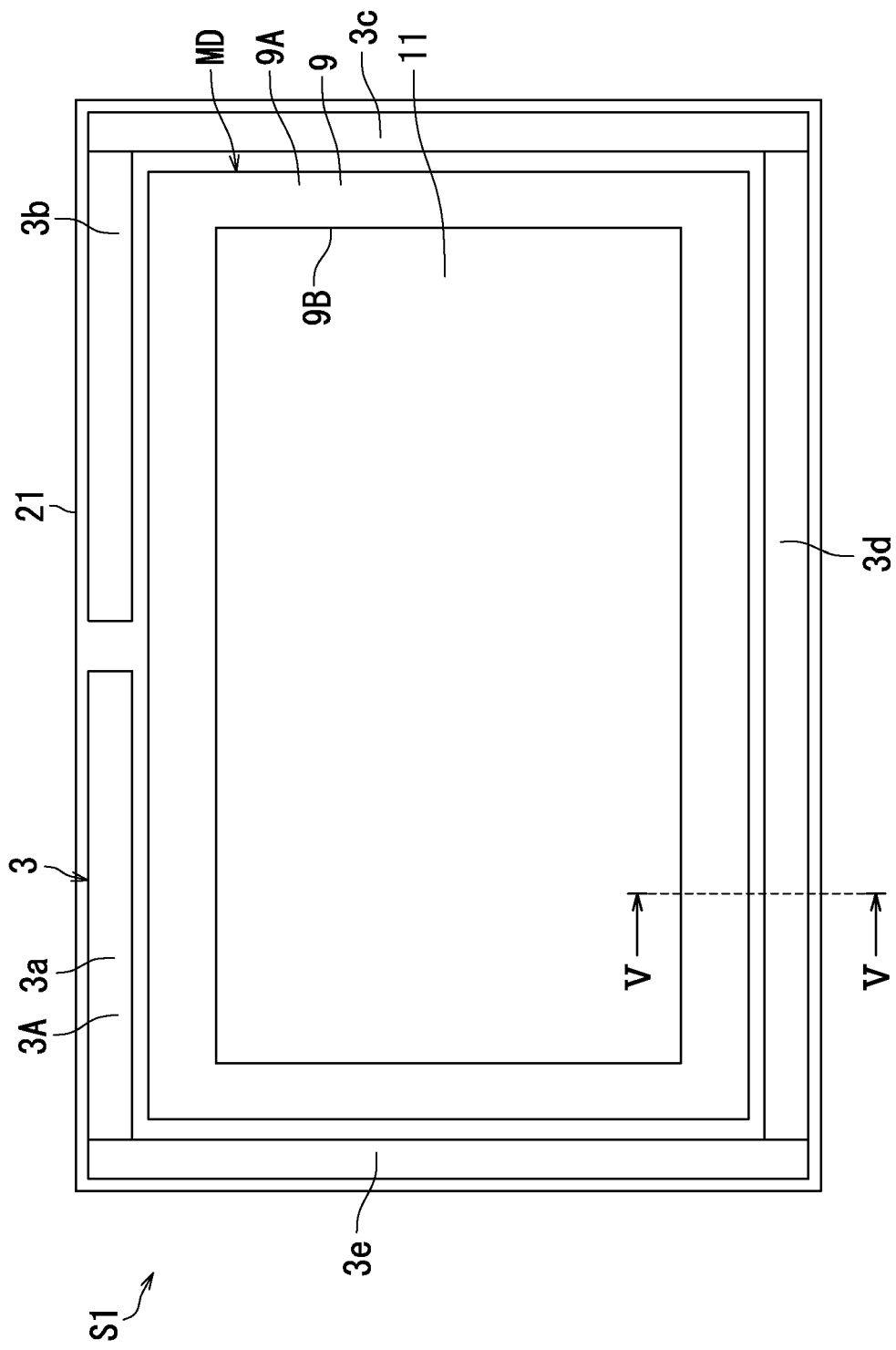
FIG. 4 is a plan view illustrating step S1 of a method of disposing a first interposition member according to Embodiment 1.
Figure 5:
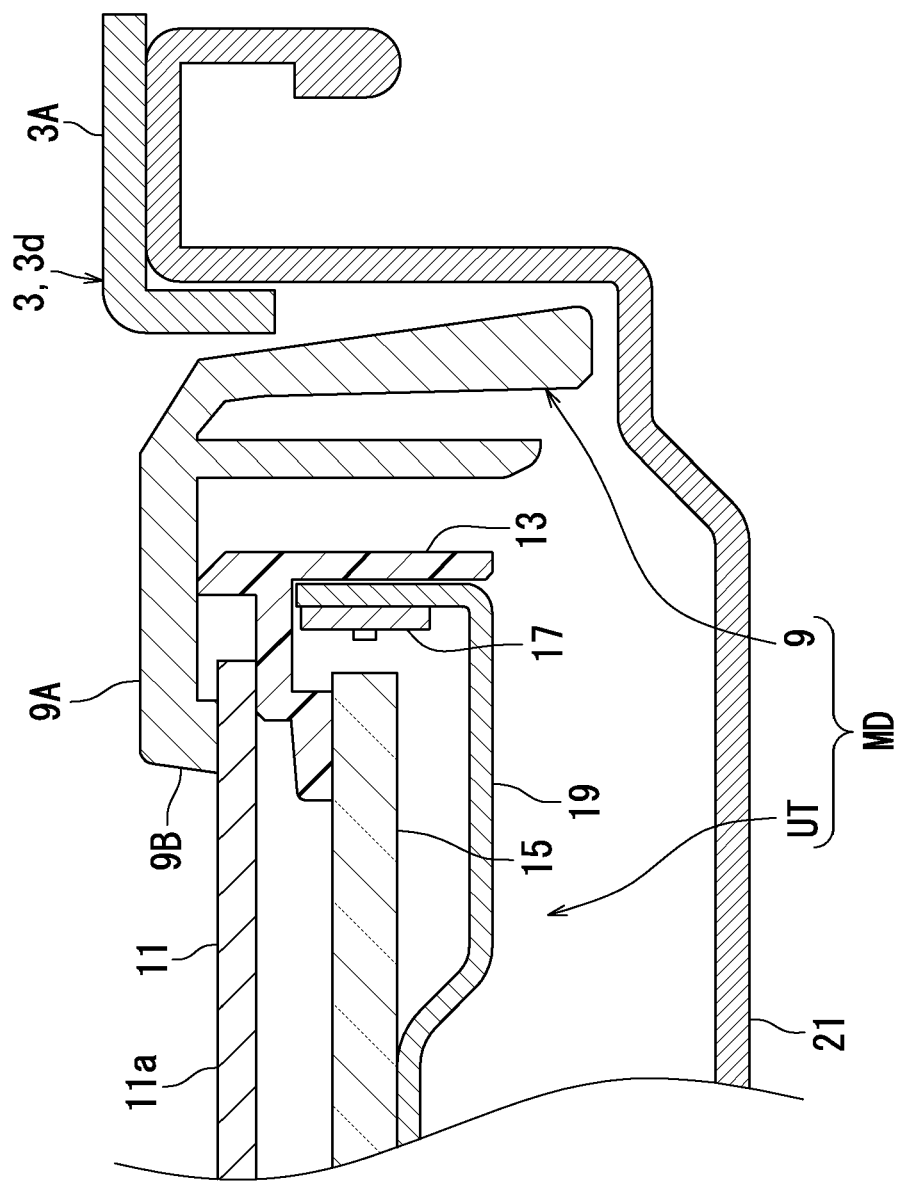
FIG. 5 is a sectional view taken along line V-V of FIG. 4.
Figure 6:
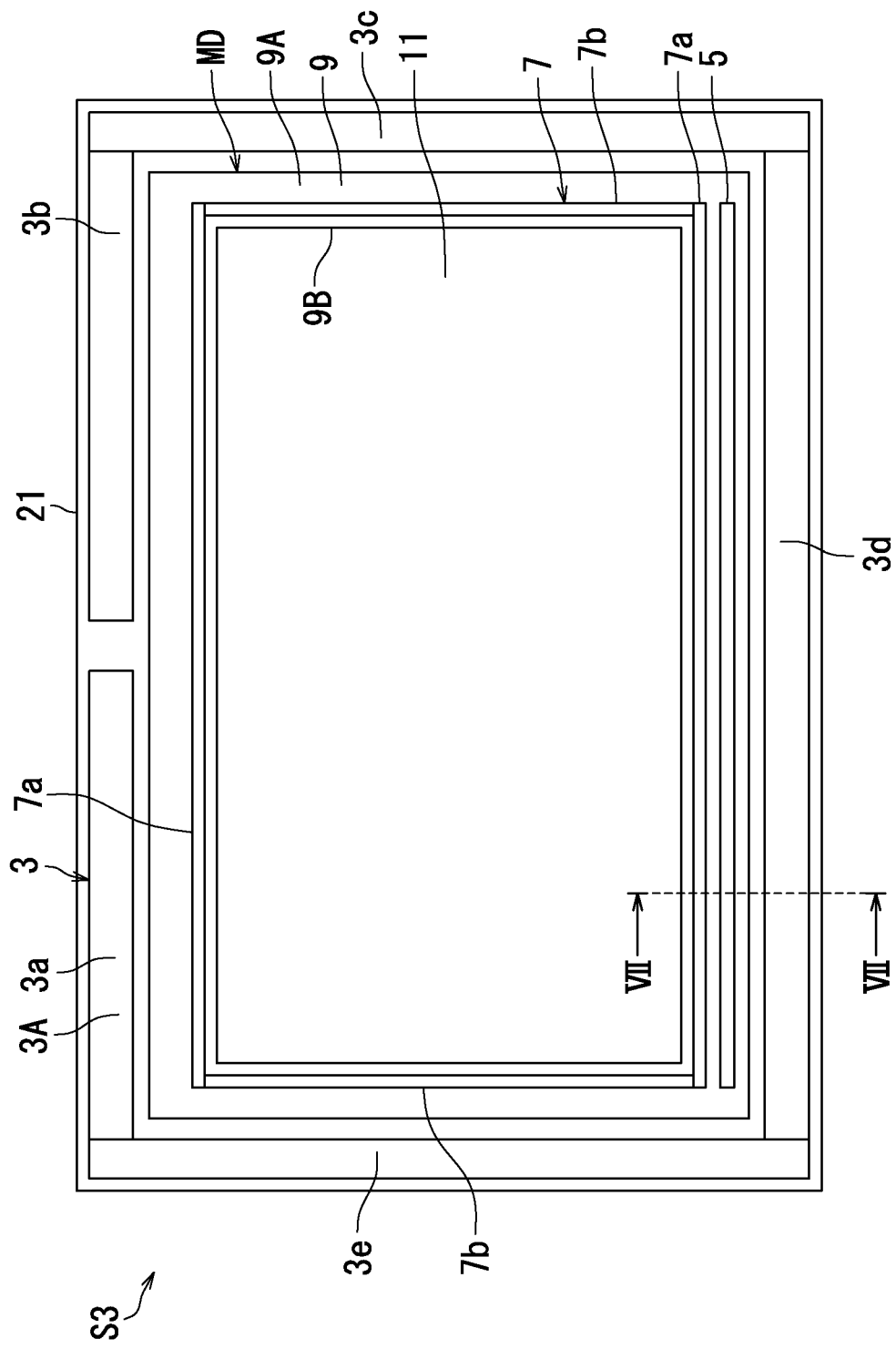
FIG. 6 is a plan view illustrating step S3 of the method of disposing the first interposition member according to Embodiment 1.
Figure 7:
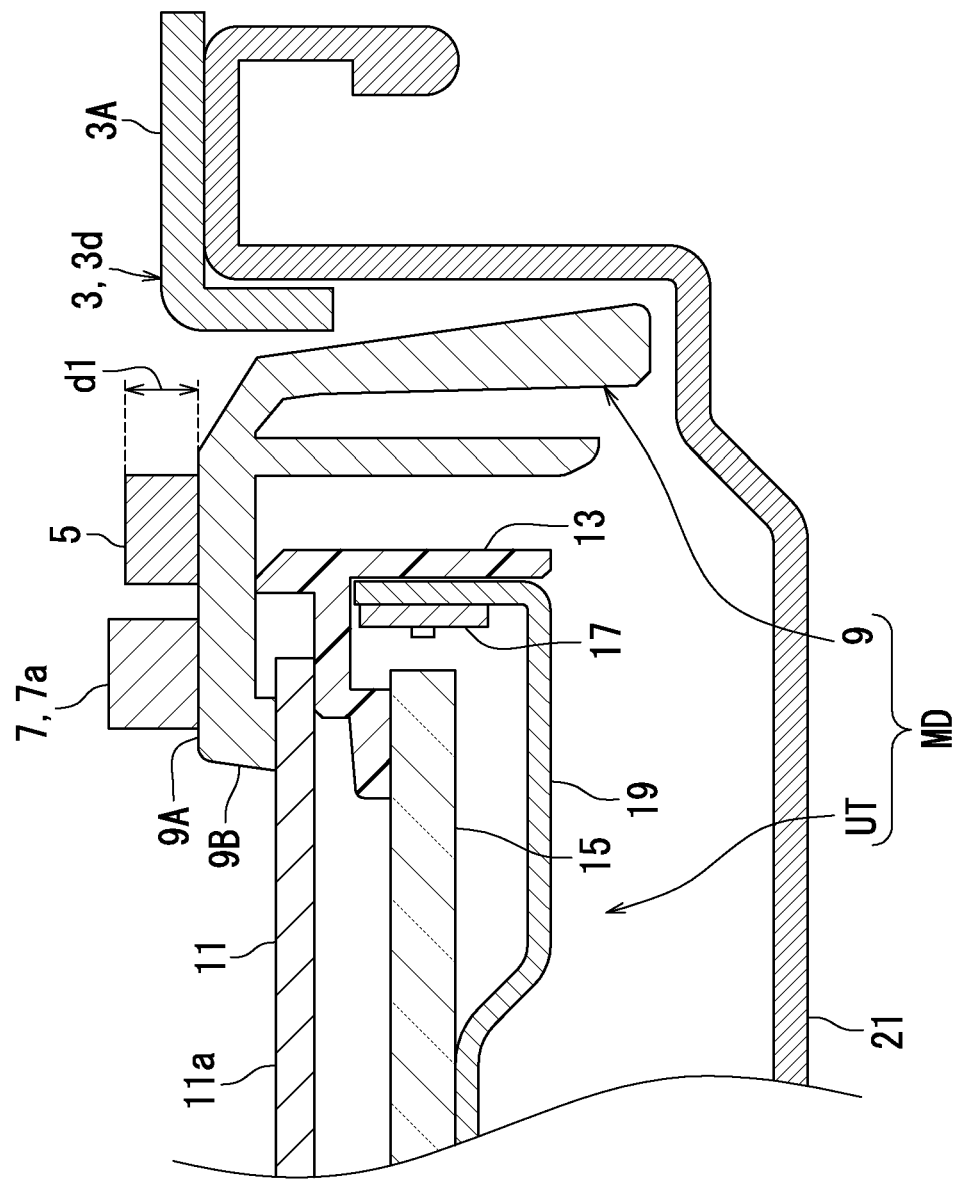
FIG. 7 is a sectional view taken along line VII-VII of FIG. 6.
Figure 8:
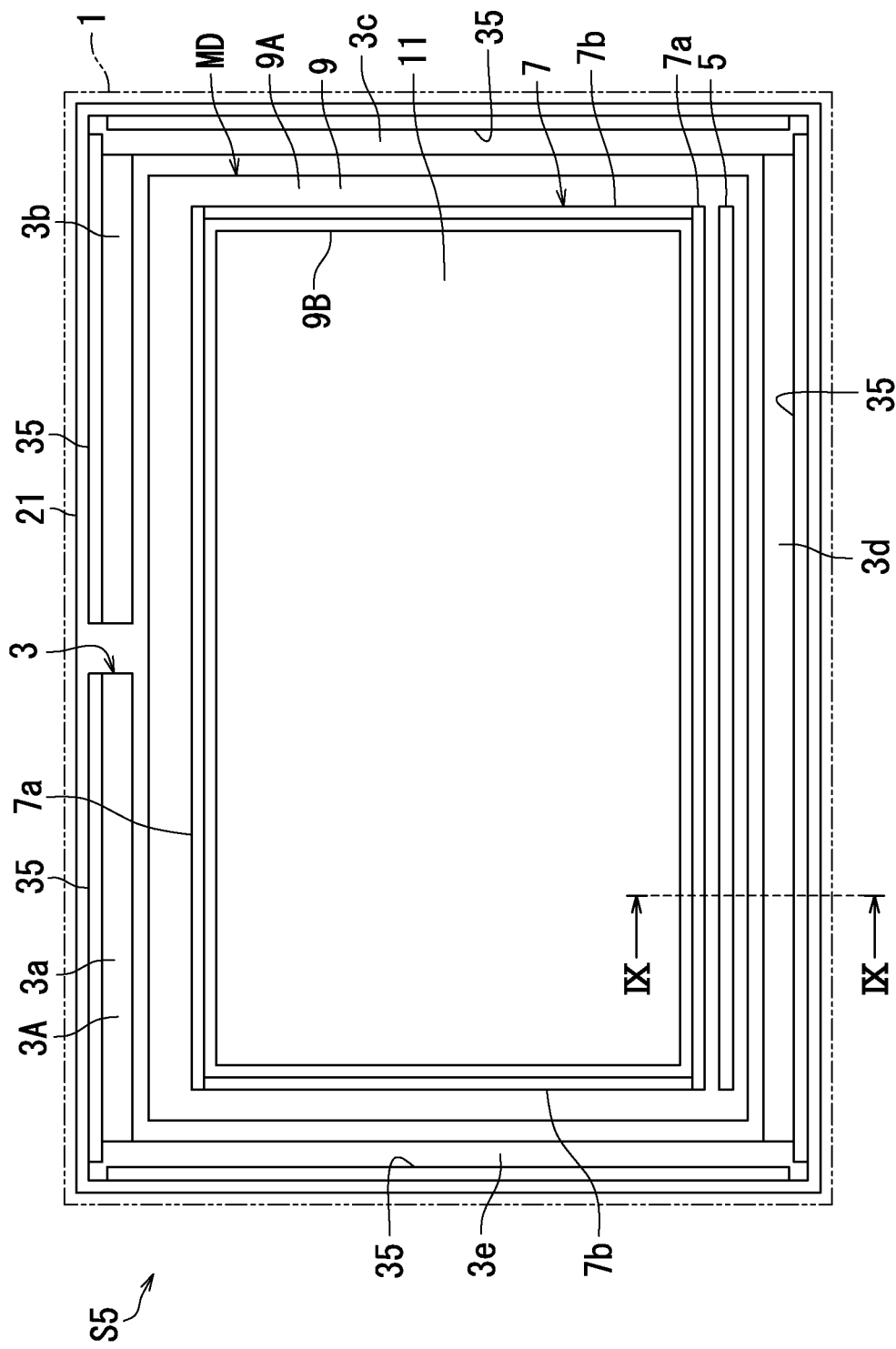
FIG. 8 is a plan view illustrating step S5 of the method of disposing the first interposition member according to Embodiment 1.
Figure 9:
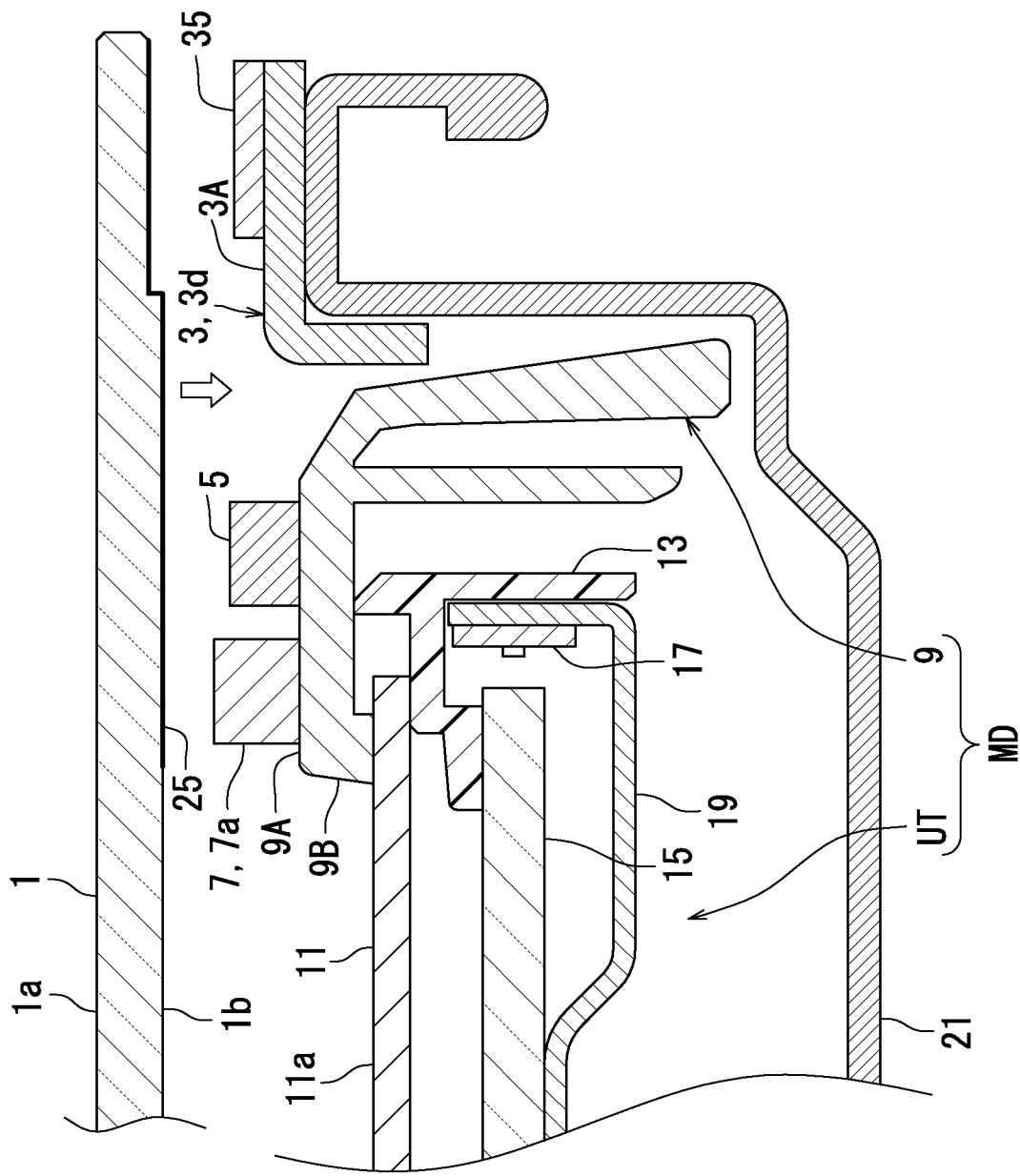
FIG. 9 is a sectional view taken along line IX-IX of FIG. 8.

Next, a method of disposing the first interposition member 5 is described with reference to FIGS. 4 to 9. FIG. 4 is a view illustrating step S1 of the method of disposing the first interposition member 5. FIG. 5 is a sectional view taken along line V-V of FIG. 4. FIG. 6 is a view illustrating step S3 of the method of disposing the first interposition member 5. FIG. 7 is a sectional view taken along line VII-VII of FIG. 6. FIG. 8 is a view illustrating step S5 of the method of disposing the first interposition member 5. FIG. 9 is a sectional view taken along line IX-IX of FIG. 8. In FIG. 8, in order to simplify the drawing, the cover member 1 is indicated by a two-dotted chain line.

As illustrated in FIGS. 4 to 9, the method of disposing the first interposition member 5 includes step S1 to step S5.

As illustrated in FIGS. 4 and 5, in step S1, the tray 21 which is disposed substantially horizontally is attached to the back surface of the display module MD which is disposed substantially horizontally. Furthermore, the cover holding member 3 is attached to the tray 21 along the periphery of the tray 21. The cover holding member 3 includes a holding portion 3a, a holding portion 3b, a holding portion 3c, a holding portion 3d, and a holding portion 3e. Each of the holding portion 3a to the holding portion 3e has a substantially flat plate shape of a substantially linear shape and has the front surface 3A.

As illustrated in FIGS. 6 and 7, in step S3, the first interposition member 5 is disposed on the front surface 9A of the support which is disposed substantially horizontally.

(Specifically, the first interposition member 5 is disposed in a region corresponding to one long side of an inner periphery 9B of the support 9 on the front surface 9A of the support 9. The first interposition member 5 extends along the one long side of the inner periphery 9B of the support 9. In other words, the first interposition member 5 extends along one long side of the periphery of the display panel 11. More specifically, the first interposition member 5 is disposed on the front surface 9A of the support 9 in a region indirectly facing the side surface of the light source 17.

Furthermore, the second interposition member 7 is disposed on the front surface 9A of the support 9 which is disposed substantially horizontally. Specifically, the second interposition member 7 is disposed on the front surface 9A of the support 9 along the inner periphery 9B of the support 9. In other words, the second interposition member 7 is disposed on the front surface 9A of the support 9 along the periphery of the display panel 11. More specifically, the second interposition member 7 includes a pair of dust-proof interposition portions 7a facing each other, and a pair of dust-proof interposition portions 7b facing each other. The dust-proof interposition portion 7a close to the light source 17 in the pair of dust-proof interposition portions 7a is adjacent to the first interposition member 5 with a gap between the first interposition member 5 and the dust-proof interposition portion 7a.

As illustrated in FIG. 7, prior to attachment of the cover member 1, the first interposition member 5 has a height d1 and has, for example, a substantially rectangular shape in sectional view. The height d1 indicates a height of the first interposition member 5 with respect to the front surface 9A of the support 9. The height d1 is larger than a gap d0 (FIG. 3) between the back surface 1b of the cover member 1 and the front surface 9A of the support 9. The gap d0 is, for example, 1.5 mm and the height d1 is, for example, 2 mm.

As illustrated in FIGS. 8 and 9, in step S5, the double-sided adhesive tape 35 adheres to the front surface 3A of the cover holding member 3 along the outer edge of she cover holding member 3. Furthermore, the cover member 1 is pressed against the double-sided adhesive tape 35 using a jig (not illustrated) and adheres to the double-sided adhesive tape 35. As a result, the cover member 1 is held by the cover holding member 3.

When the cover member 1 is held by the cover holding member 3, the first in member 5 and the second interposition member 7 are pressed by the cover member 1. Therefore, each of the first interposition member 5 and the second interposition member 7 is in close contact with the back surface 1b of the cover member 1 and the front surface 9A of the support (FIG. 3). In other words, each of the first interposition member 5 and the second interposition member 7 is disposed on the support 9.

As described with reference to FIGS. 6 to 9, according to Embodiment 1, the first interposition member 5 is disposed in the display apparatus 100 simple steps (S1 to S5) as compared to a step for replacing air with dry air. As a result, it is possible to suppress an increase in manufacturing cost of the display apparatus 100 while reducing occurrence of dew condensation by the first interposition member 5.

Particularly, step S1 to step S5 are not dedicated steps for disposing the first interposition member 5. That is, step S1 to step S5 are steps for disposing the second interposition member 7 and the cover member 1. Therefore, since a dedicated step for disposing the first interposition member 5 is unnecessary, it is possible to further suppress an increase in manufacturing cost of the display apparatus 100.

In addition, according to Embodiment 1, the second interposition member 7 is disposed along the periphery of the display panel 11. Therefore, dust entering the space SP can be avoided. As a result, adhesion of dust to the front surface 11a of the display panel 11 and the back surface 1b of the cover member 1 can be suppressed.

In addition, in Embodiment 1, it is preferable that the second interposition member 7 has a heat insulating property. The heat insulating property means a property in which heat transfer is less likely to occur in a substance (substantially, in the second interposition member 7) from a high temperature region (specifically, the support 9) toward a low temperature region (specifically, the cover member 1). For example, the thermal conductivity of the second interposition member 7 is equivalent to a thermal conductivity of a porous material. The porous material is, for example, a sponge or foam material. The second interposition member 7 is formed of, for example, the porous material (for example, a rubber sponge).

If the second interposition member 7 has the heat insulating property, it is possible to effectively suppress heat being transferred from the outside of the space SP to the front surface 11a of the display panel 11 through the second interposition member 7. As a result, the durability of the display panel 11 can be improved.

Furthermore, as described with reference to FIG. 7, according to Embodiment 1, the height d1 of the first interposition member 5 is larger than the gap d0 (FIG. 3) between the back surface 1b of the cover member 1 and the front surface 9A of the support 9. The first interposition member 5 has elasticity. Therefore, as described with reference to FIG. 9, when the cover member 1 is held by the cover holding member 3, the first interposition member 5 is pressed by the cover member 1. When the first interposition member 5 is pressed, it is possible to suppress air being interposed between the first interposition member 5 and the front surface 9A of the support 9 and air being interposed between the first interposition member 5 and the back surface 1b of the cover member 1. Therefore, it is possible to increase a moving amount of heat from the support 9 to the cover member 1. As a result, the difference between a temperature in the vicinity of the heat source (specifically, the light source 17) and a temperature of the cover member 1 is alleviated and it is possible to further suppress occurrence of dew condensation on the back surface 1b of the cover member 1.

Figure 10:
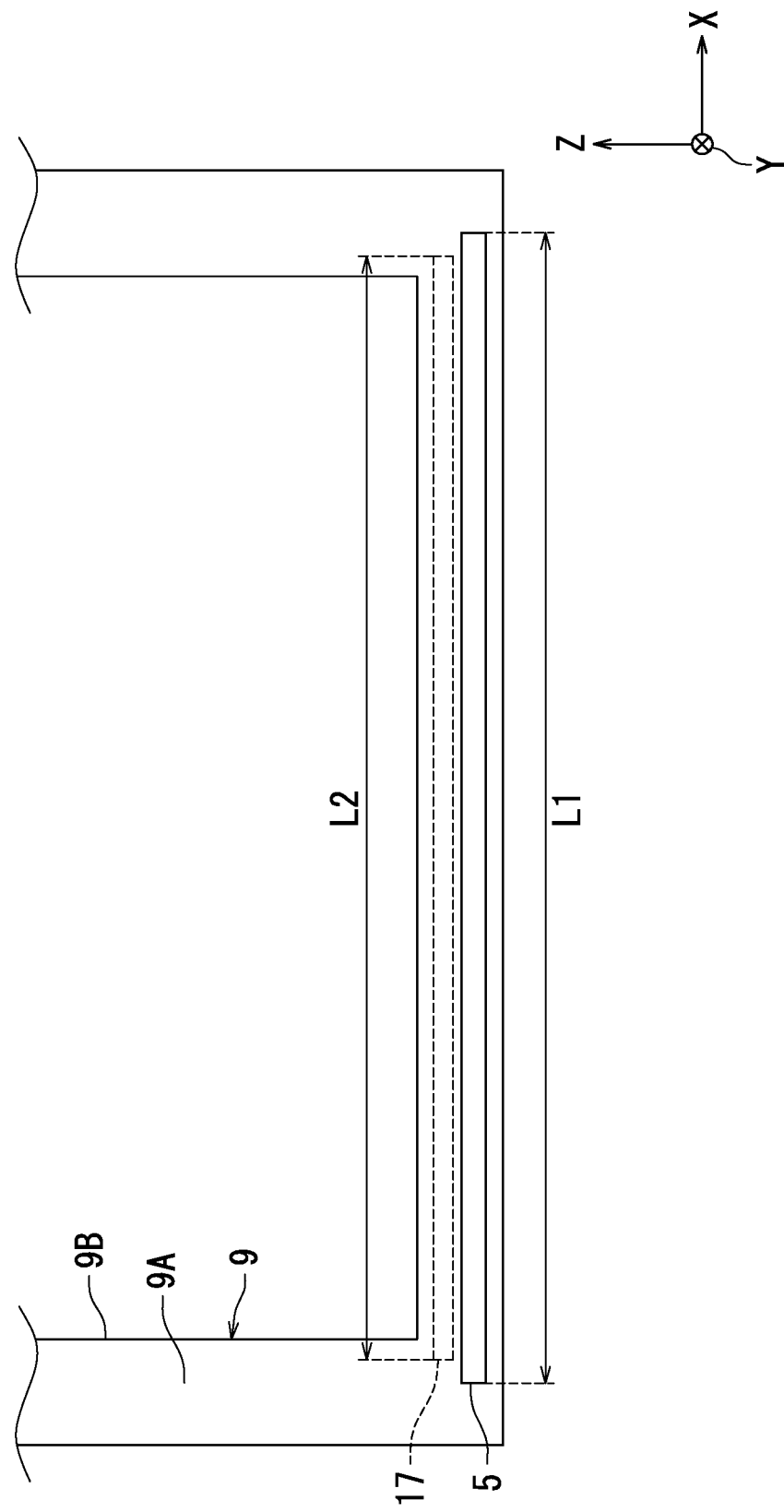
FIG. 10 is a plan view illustrating a length of the first interposition member according to Embodiment 1.

Next, a length L1 of the first interposition member 5 is described with reference to FIG. 10. FIG. 10 is a view illustrating the length L1 of the first interposition member 5. As illustrated in FIG. 10, the first interposition member 5 extends along the light source 17. It is preferable that the length L1 of the first interposition member 5 is longer than a length L2 of the light source 17. Since the first interposition member 5 exists over a range longer than the light source 17 which is regarded as the heat source, heat generated by the light source 17 can be further effectively moved to the cover member 1. Therefore, the difference between a temperature in the vicinity of the light source 17 and a temperature of the cover member 1 is further alleviated. As a result, it is possible to further suppress occurrence of dew condensation on the back surface 1b of the cover member 1.

The length L1 of the first interposition member 5 may be substantially the same as the length L2 of the light source 17, or may be shorter than the length L2 of the light source 17.

In addition, in FIG. 10, in order to simplify the drawing, the second interposition member 7 is not illustrated.

First Modification Example

A display apparatus 100 according to a first modification example of Embodiment 1 of the disclosure is described with reference to FIG. 3. The first modification example is different from Embodiment 1 in that the thermal conductivity of the first interposition member 5 is determined as compared to the thermal conductivity of the cover member 1. Hereinafter, differences between the first modification example and Embodiment 1 are mainly described.

As illustrated in FIG. 3, the thermal conductivity of the first interposition member 5 is higher than the thermal conductivity of the cover member 1. Therefore, heat generated by the light source 17 can be further effectively moved to the cover member 1 as compared to a case where the thermal conductivity of the first interposition member 5 is equal to or less than the thermal conductivity of the cover member 1. Therefore, the difference between a temperature in the vicinity of the light source 17 and a temperature of the cover member 1 is effectively alleviated and it is possible to effectively suppress occurrence of dew condensation on the back surface 1b of the cover member 1.

Second Modification Example

A display apparatus 100 according to a second modification example of Embodiment 1 of the disclosure is described with reference to FIG. 3. The second modification example is different from Embodiment 1 in that the thermal conductivity of the first interposition member 5 is determined as compared to the thermal conductivity of the support 9. Hereinafter, differences between a second modification example and Embodiment 1 are mainly described.

As illustrated in FIG. 3, the thermal conductivity of the first interposition member 5 is higher than the thermal conductivity of the support 9. Therefore, heat generated by the light source 17 can be further effectively moved to the cover member 1 as compared to a case where the thermal conductivity of the first interposition member 5 is equal to or less than the thermal conductivity of the support 9. Therefore, according to the second modification example, the difference between a temperature in the vicinity of the light source 17 and a temperature of the cover member 1 is effectively alleviated and it is possible to effectively suppress occurrence of dew condensation on the back surface 1b of the cover member 1.

Third Modification Example

A display apparatus 100 according to a third modification example of Embodiment 1 of the disclosure is described with reference to FIG. 3. The third modification example is different from Embodiment 1 in that the thermal conductivity of the first interposition member 5 is determined as compared to the thermal conductivity of the second interposition member 7. Hereinafter, differences between the third modification example and Embodiment 1 are mainly described.

As illustrated in FIG. 3, the thermal conductivity of the first interposition member 5 is higher than the thermal conductivity of the second interposition member 7. Therefore, heat generated by the light source 17 can be further effectively moved to the cover member 1 as compared to a case where the thermal conductivity of the first interposition member 5 is equal to or less than the thermal conductivity of the second interposition member 7. Therefore, according to the third modification example, the difference between a temperature in the vicinity of the light source 17 and a temperature of the cover member 1 is effectively alleviated and it is possible to effectively suppress occurrence of dew condensation on the back surface 1b of the cover member 1.

Particularly, in a case where the second interposition member 7 has the heat insulating property, heat generated by the light source 17 is less likely to move to the cover member 1 through the second interposition member 7. Therefore, the movement of heat from the support 9 to the cover member 1 is promoted by the first interposition member 5 having the thermal conductivity higher than the thermal conductivity of the second interposition member 7, and the difference between a temperature in the vicinity of the light source 17 and a temperature of the cover member 1 is alleviated.

Fourth Modification Example

A display apparatus 100A according to a fourth modification example of Embodiment 1 of the disclosure is described with reference to FIGS. 11 to 13. The fourth modification example is different from Embodiment 1 in that the fourth modification example has a first interposition member (hereinafter, referred to as a "first interposition member 53") corresponding to a heat source (hereinafter, referred to as a "heat source 51") different from the light source 17. Hereinafter, differences between the fourth modification example and Embodiment 1 are mainly described.

Figure 11:
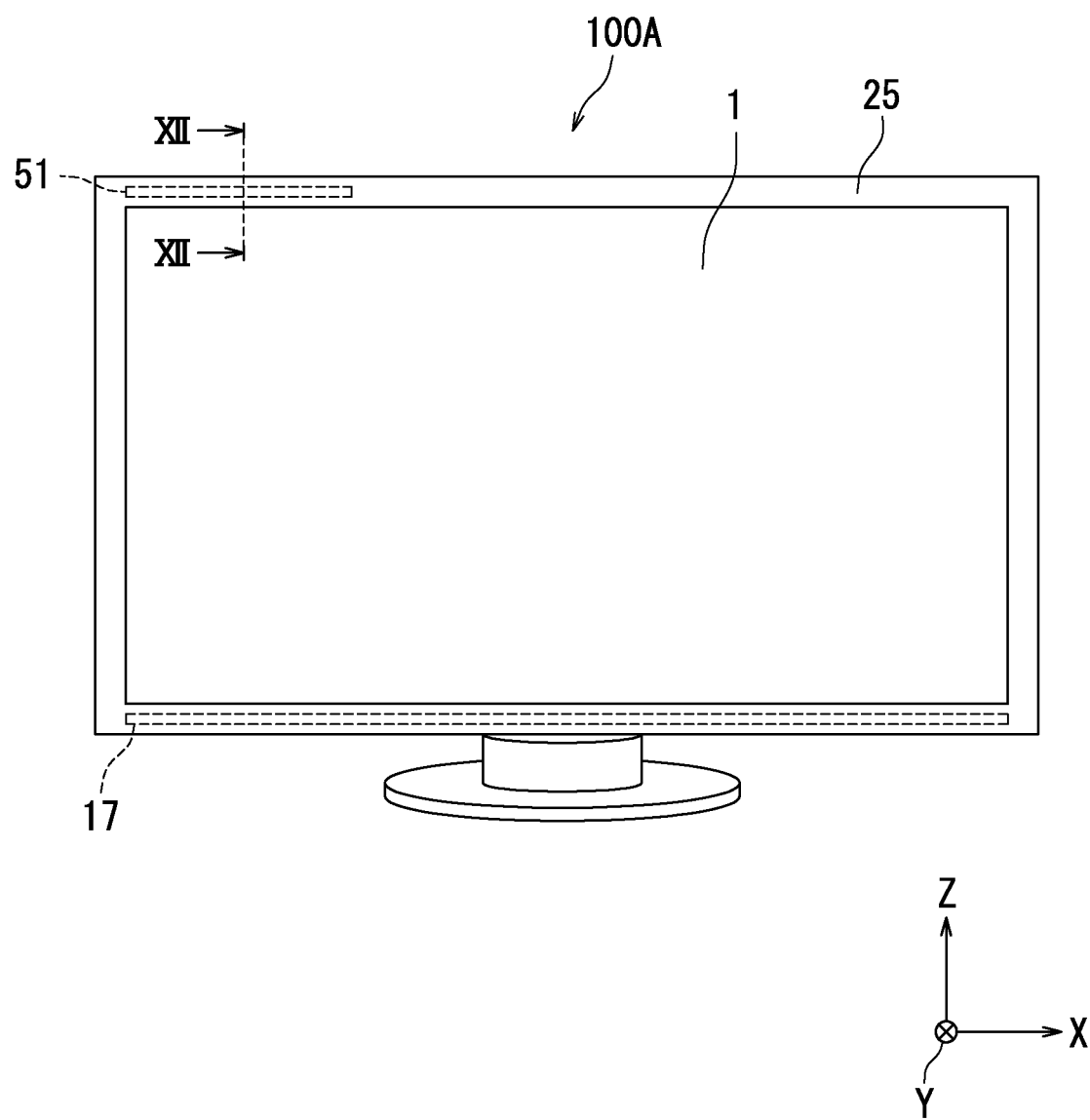
FIG. 11 is a front view illustrating a display apparatus according to a fourth modification example of Embodiment 1 of the disclosure.
Figure 12:
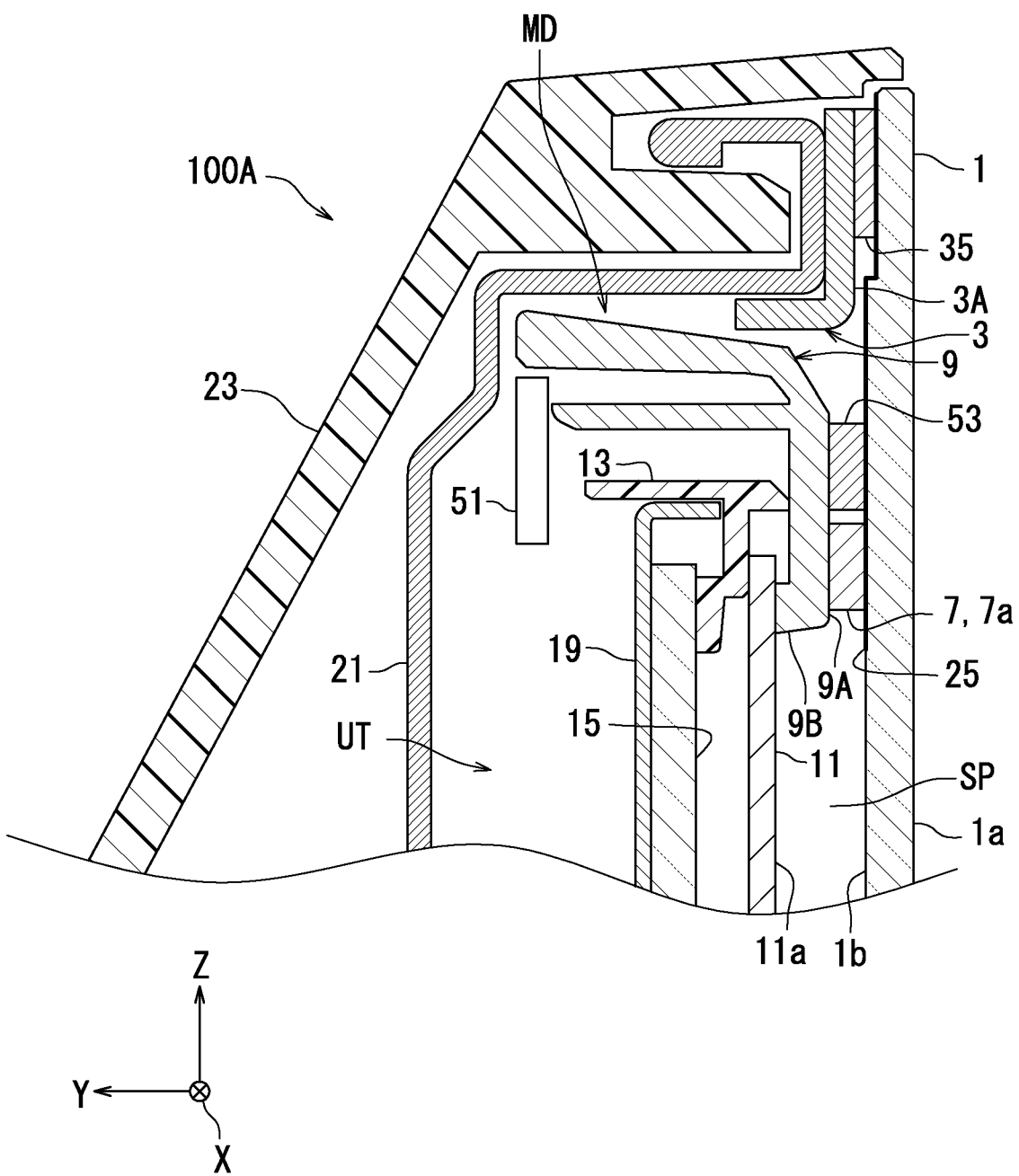
FIG. 12 is a sectional view taken along line XII-XII of FIG. 11.

FIG. 11 is a front view illustrating the display apparatus 100A according to the fourth modification example. As illustrated in FIG. 11, the display apparatus 100A includes the heat source 51. The heat source 51 is, for example, a circuit module. The circuit module includes a circuit and a board on which the circuit is mounted. The circuit is, for example, all or a part of a power supply circuit or all or a part of a driving circuit of a display panel 11. The heat source 51 is disposed at an upper end portion in the display apparatus 100A. Moreover, the heat source 51 may be disposed at a lower end portion in the display apparatus 100A or may be disposed at a side end portion in the display apparatus 100A.

Here, a heat amount of heat generated by the light source 17 is smaller than a heat amount generated by the heat source 51. Therefore, a difference between a temperature in the vicinity of the light source 17 and a temperature of the cover member 1 is small and a possibility of occurrence of dew condensation due to the temperature difference is low. Therefore, in the fourth modification example, occurrence of dew condensation due to the difference between a temperature in the vicinity of the heat source 51 and a temperature of the cover member 1 is reduced.

Next, a sectional configuration of the display apparatus 100A is described with reference to FIG. 12. FIG. 12 is a sectional view taken along line XII-XII of FIG. 11. As illustrated in FIG. 12, the display apparatus 100A includes the first interposition member 53 instead of the first interposition member 5 according to Embodiment 1. In addition, a display unit UT includes the heat source 51. Other configurations of the display apparatus 100A are the same as those of the display apparatus 100 according to Embodiment 1.

The first interposition member 53 has elasticity and thermal conductance similar to those of the first interposition member 5 according to Embodiment 1. Therefore, a thermal conductivity of the first interposition member 53 is similar to the thermal conductivity of the first interposition member 5 according to Embodiment 1.

The first interposition member 53 is interposed between a support 9 and a cover member 1. The first interposition member 53 is in contact with the support 9 and the cover member 1. Specifically, the first interposition member 53 is in contact with a front surface 9A of the support 9 and a back surface 1b (for example, a black region 25) of the cover member 1. More specifically, the first interposition member 53 is disposed on the front surface 9A of the support 9 and is pressed toward the support 9 by the back surface 1b of the cover member 1. As a result, the first interposition member 53 is in close contact with the back surface 1b of the cover member 1 and the front surface 9A of the support 9. In addition, the first interposition member 53 is positioned further outside than the second interposition member 7 with respect to the display panel 11. Furthermore, the first interposition member 53 is adjacent to the second interposition member 7 with a gap between the first interposition member 53 and the second interposition member 7.

The heat source 51 faces the support 9 and is positioned inside the support 9. Part (specifically, the front surface 9A) of the support 9 is positioned between the first interposition member 53 and the heat source 51. Specifically, the first interposition member 53 is disposed on the front surface 9A of the support 9 in a region indirectly facing the heat source 51.

As described with reference to FIGS. 11 and 12, according to the fourth modification example, the first interposition member 53 is provided and the movement of heat from the support 9 to the cover member 1 is promoted. As a result, the difference between a temperature in the vicinity of the heat source 51 and a temperature of the cover member 1 is alleviated and it is possible to suppress occurrence of dew condensation on the back surface 1b of the cover member 1.

Specifically, the first interposition member 53 is disposed so that part (specifically, the front surface 9A) of the support 9 is positioned between the first interposition member 53 and the heat source 51. Therefore, the first interposition member 53 is disposed between the support 9 and the cover member 1 in the vicinity of the heat source 51. That is, the first interposition member 53 is disposed at a place where dew condensation is likely to occur due to the temperature difference in the display apparatus 100A. As a result, it is possible to effectively suppress the occurrence of dew condensation on the back surface of the cover member 1.

Next, a length L3 of the first interposition member 53 is described with reference to FIG. 13. FIG. 13 is a view illustrating the length L3 of the first interposition member 53. As illustrated in FIG. 13, the first interposition member 53 extends along the heat source 51. It is preferable that the length L3 of the first interposition member 53 is longer than a length L4 of the heat source 51. Since the first interposition member 53 exists over a range longer than the heat source 51, heat generated by the heat source 51 can further be effectively transferred to the cover member 1. Therefore, the difference between a temperature in the vicinity of the heat source 51 and a temperature of the cover member 1 is further alleviated. As a result, it is possible to further suppress occurrence of dew condensation on the back surface 1b of the cover member 1.

The length L3 of the first interposition member 53 may be substantially the same as the length L4 of the heat source 51, or may be shorter than the length L4 of the heat source 51.

Figure 13:
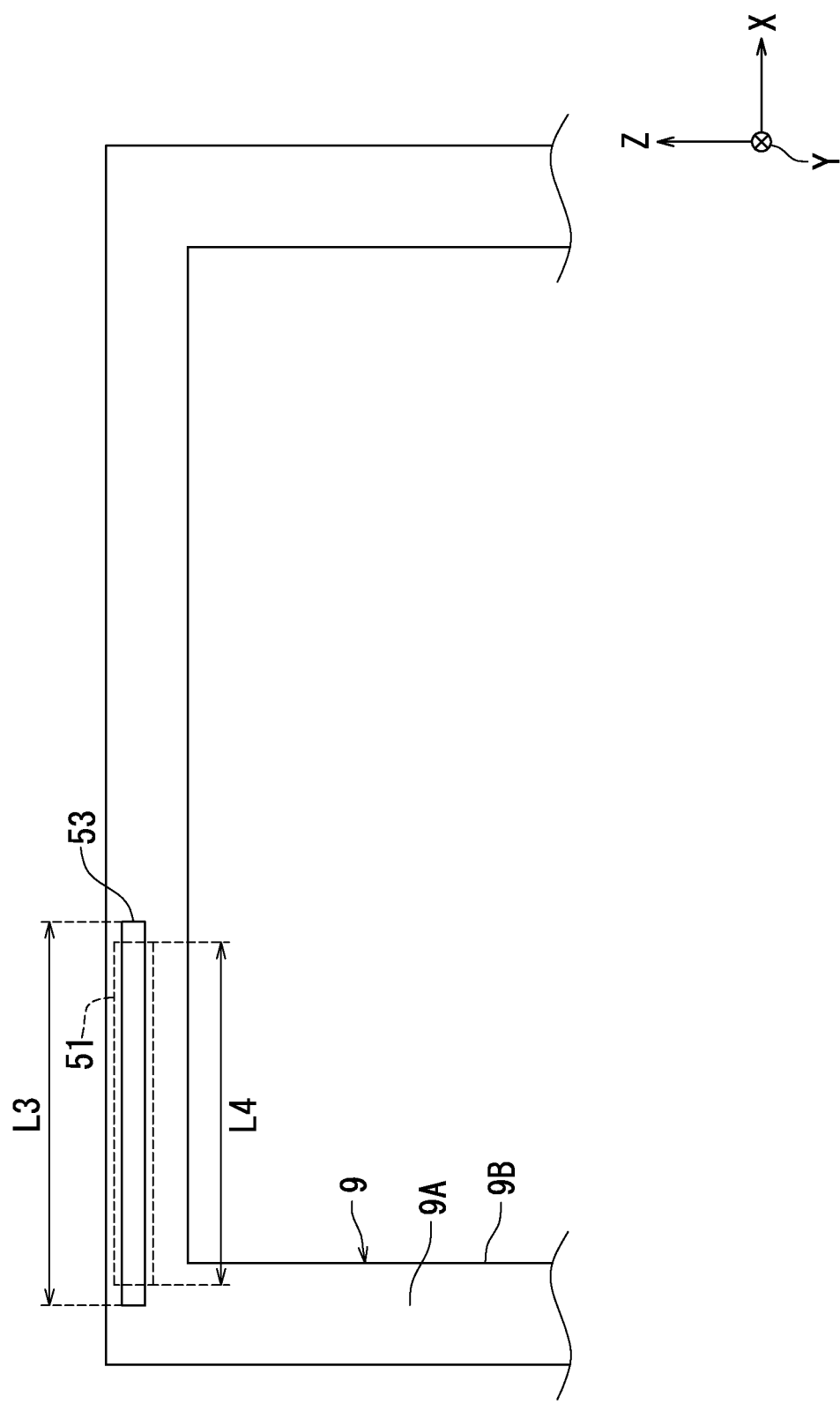
FIG. 13 is a plan view illustrating a length of a first interposition member according to a fourth modification example of Embodiment 1.

In FIG. 13, in order to simplify the drawing, the second interposition member 7 is not illustrated.

Embodiment 2

A display apparatus 100B according to Embodiment 2 of the disclosure is described with reference to FIGS. 14 and 15. Embodiment 2 is different from Embodiment 1 in that a shape of a first interposition member (hereinafter, referred to as a "first interposition member 61") is the same as the shape of the second interposition member 7 according to Embodiment 1, and the second interposition member 7 is not provided in Embodiment 2. Hereinafter, differences between Embodiment 2 and Embodiment 1 are mainly described.

First, an internal configuration of the display apparatus 100B is described with reference to FIG. 14. FIG. 14 is a front view illustrating the display apparatus 100B. In FIG. 14, in order to simplify the internal configuration, the cover member 1 is indicated by a two-dotted chain line.

Figure 14:
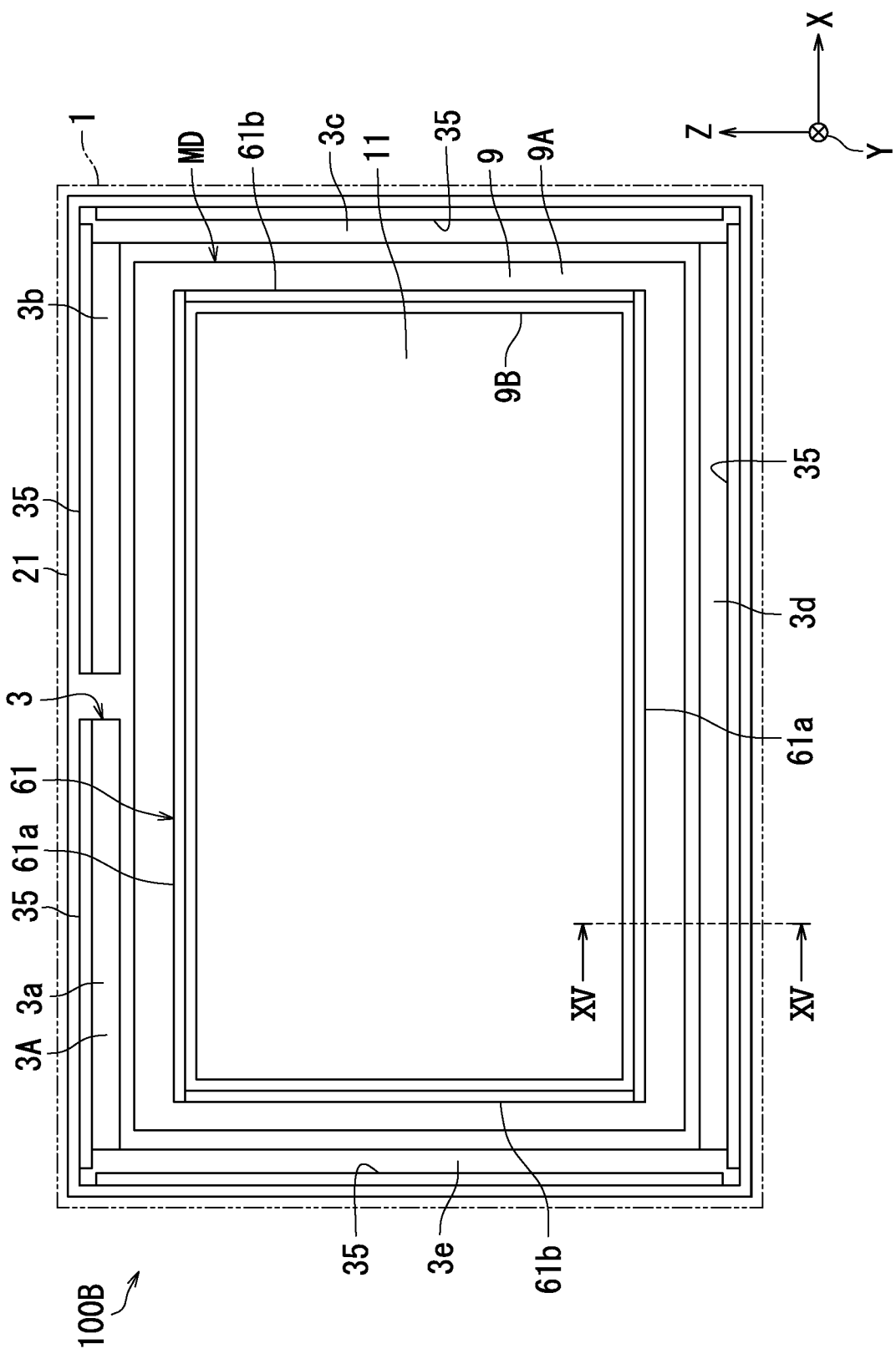
FIG. 14 is a front view illustrating a display apparatus according to Embodiment 2 of the disclosure.
Figure 15:
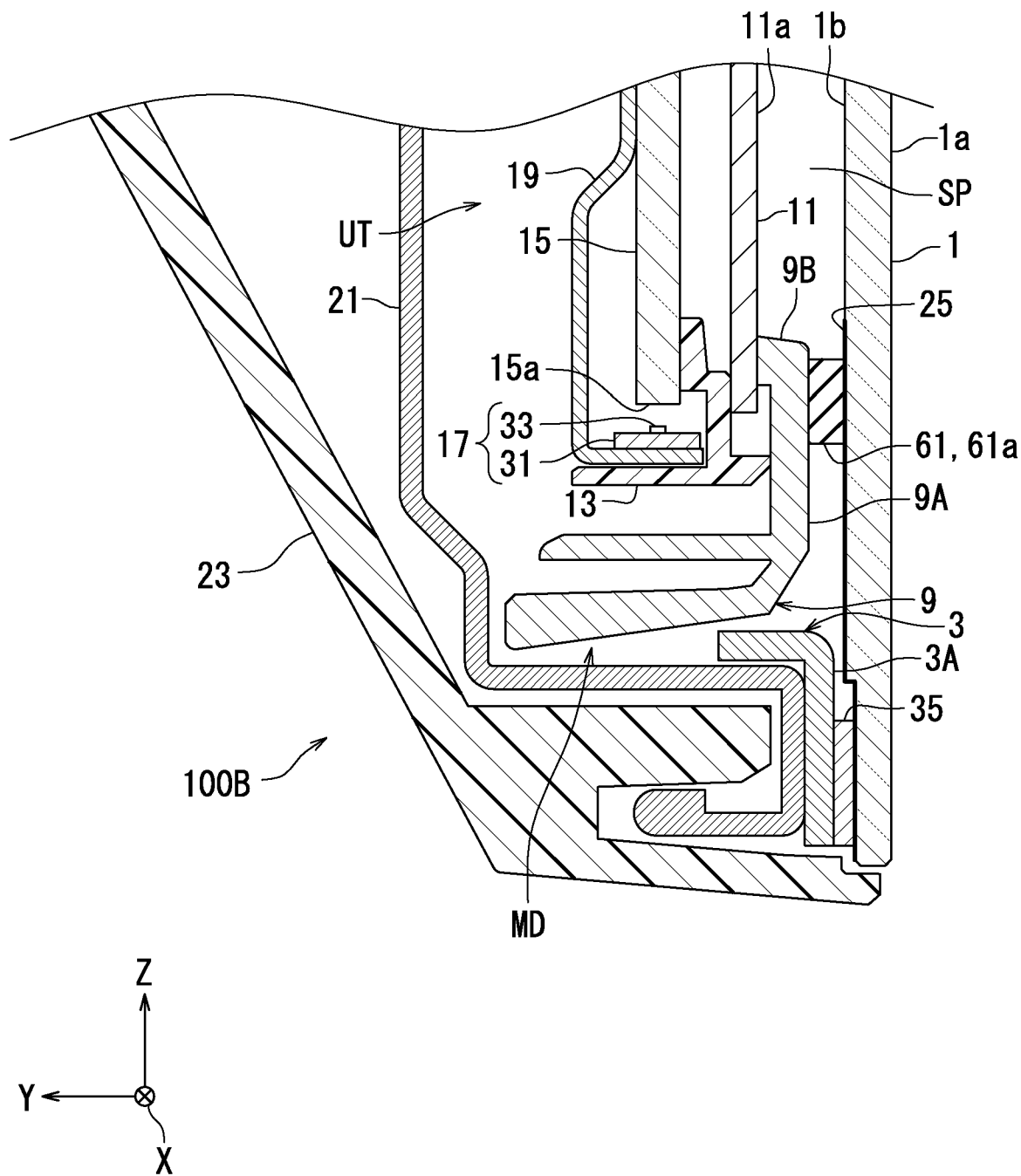
FIG. 15 is a sectional view taken along line XV-XV of FIG. 14.

As illustrated in FIG. 14, the display apparatus 100B includes the first interposition member 61 instead of the first interposition member 5 and the second interposition member 7 according to Embodiment 1. Other configurations of the display apparatus 100B are the same as those of the display apparatus 100 according to Embodiment 1.

The first interposition member 61 has elasticity and thermal conductance similar to those of the first interposition member 5 according to Embodiment 1. Therefore, a thermal conductivity of the first interposition member 61 is similar to the thermal conductivity of the first interposition member 5 according to Embodiment 1.

The first interposition member 61 has a substantially rectangular ring shape. The first interposition member 61 is disposed on a front surface 9A of a support 9. Specifically, the first interposition member 61 is disposed on the front surface 9A of the support 9 along an inner periphery 9B of the support 9. In other words, the first interposition member 61 is disposed on the front surface 9A of the support 9 along a periphery of the display panel 11. More specifically, the first interposition member 61 includes a pair of heat-conducting interposition portions 61a facing each other, and a pair of heat-conducting interposition portions 61b facing each other.

In Embodiment 2, at least part of the first interposition member 61 may have thermal conductance. Specifically, all of the first interposition member 61, that is, the pair of heat-conducting interposition portions 61a and the pair of heat-conducting interposition portions 61b may have the thermal conductance. In addition, part of the first interposition member 61, that is, the heat-conducting interposition portion 61a close to the light source 17 in the pair of heat-conducting interposition portions 61a may have the thermal conductance.

Next, a sectional configuration of the display apparatus 100B is described with reference to FIG. 15. FIG. 15 is a sectional view taken along line XV-XV of FIG. 14. As illustrated in FIG. 15, the first interposition member 61 is interposed between the support 9 and the cover member 1. The first interposition member 61 is in contact with the support 9 and the cover member 1. Specifically, the first interposition member 61 is in contact with the front surface 9A of the support 9 and the back surface 1b (for example, a black region 25) of the cover member 1. More specifically, the first interposition member 61 is disposed on the front surface 9A of the support and is pressed toward the support 9 by the back surface 1b of the cover member 1. As a result, the first interposition member 61 is in close contact with the back surface 1b of the cover member 1 and the front surface 9A of the support 9. In addition, since the first interposition member 61 has a substantially rectangular ring shape, the display apparatus 100B has a space SP surrounded by the first interposition member 61, the back surface 1b of the cover member 1, and the front surface 11a of the display panel 11.

Part (specifically, the front surface 9A) of the support 9 is positioned between the first interposition member 61 and the light source 17. Specifically, the first interposition member 61 is disposed on the front surface 9A of the support 9 in a region indirectly facing a side surface of the light source 17.

As described with reference to FIGS. 14 and 15, according to Embodiment 2, similar to Embodiment 1, at least part of the first interposition member 61 has the thermal conductance. As a result, in Embodiment 2, similar to Embodiment 1, the difference between a temperature in the vicinity of a heat source (specifically, the light source 17) and a temperature of the cover member 1 is alleviated, and it is possible to suppress occurrence of dew condensation on the back surface 1b of the cover member 1. In addition, similar to Embodiment 1, in Embodiment 2, it is possible to effectively suppress the occurrence of dew condensation on the back surface 1b of the cover member 1 as long as the first interposition member 61 is in contact with the support 9 and the cover member 1. In addition, Embodiment 2 has the same effects as those of Embodiment 1.

In addition, according to Embodiment 2, similarly to Embodiment 1, since the occurrence of dew condensation can be reduced by only additionally disposing the first interposition member 61 in the display apparatus 100B, it is possible to suppress an increase in manufacturing cost of the display apparatus 100B.

Furthermore, according to Embodiment 2, the first interposition member 61 is disposed along the display panel 11. Therefore, dust entering the space SP can be avoided. As a result, adhesion of dust to the front surface 11a of the display panel 11 and the back surface 1b of the cover member 1 can be suppressed.

Furthermore, according to Embodiment 2, the display apparatus 100B does not include a member corresponding to the second interposition member 7 of Embodiment 1. Therefore, it is possible to reduce the number of assembly steps of the display apparatus 100B as compared to Embodiment 1. As a result, it is possible to further suppress an increase in manufacturing cost of the display apparatus 100B.

The embodiments of the disclosure have been described with reference to drawings. However, the disclosure is not limited to the above-described embodiments, and can be implemented in various modes without departing from the gist thereof (for example, (1) to (4) illustrated below). Further, various embodiments can be formed by appropriately combining a plurality of constituent elements disclosed in the embodiments. For example, some constituent elements may be deleted from all the constituent elements illustrated in the embodiments. Further, the constituent elements of different embodiments may be appropriately combined. For ease of understanding, the drawings schematically illustrate mainly the respective constituent elements, and the thickness, length, number, interval, and the like of respective constituent elements illustrated in the drawings may differ from the actual on account of drawing preparation. In addition, the material, shape, dimension, and the like of the respective constituent elements illustrated in the embodiments are merely examples, and are not particularly limited, and various modifications are possible within a range that does not substantially deviate from the effect of the disclosure.

(1) As long as the first interposition member 5 has the thermal conductance, part or all of the thermal conductivity of the first interposition member 5 according to Embodiment 1 (including the third modification example), the thermal conductivity of the first interposition member 5 according to the first modification example, and the thermal conductivity of the first interposition member 5 according to the second modification example may be substantially the same or may be different from each other. Similarly, as long as the first interposition member 53 has the thermal conductance, part or all of the thermal conductivity of the first interposition member 53 according to the fourth modification example, the thermal conductivity according to the first modification example, and the thermal conductivity of the second modification example may be substantially the same or may be different from each other. Similarly, as long as the first interposition member 61 has the thermal conductance, part or all of the thermal conductivity of the first interposition member 61 according to Embodiment 2, the thermal conductivity according to the first modification example, and the thermal conductivity of the second modification example may be substantially the same or may be different from each other.

(2) The first interposition member 5 according to Embodiment 1 (including the first modification example to the third modification example) may be disposed inside the second interposition member 7 as long as it has the thermal conductance.

(3) In Embodiment 1 (including the first modification example to the fourth modification example) and Embodiment 2, each of the first interposition member 5, the first interposition member 53, and the first interposition member 61 may be formed of a single member, or may be formed of a plurality of parts. In addition, a plurality of first interposition members 5 may be positioned with gaps from each other. For example, in the fourth modification example, in addition to the first interposition member 53, the first interposition member 5 corresponding to the light source 17 may be disposed. For example, in a case where a plurality of heat sources 51 exist, the first interposition member 5 may be disposed for each of the heat sources 51. In addition, the second interposition member 7 may be formed of a single member as long as it is disposed along the periphery of the display panel 11.

(4) In Embodiment 1 (including the first modification example to the fourth modification example) and Embodiment 2, the shape of the support 9 is not particularly limited and may be any shape as long as it supports the display unit UT. In addition, the support 9 may be formed of a single member or may be formed of a plurality of parts.

The disclosure provides a display apparatus and has industrial applicability.

The present disclosure contains subject matter related to that disclosed in Japanese Priority Patent Application JP 2017-217074 filed in the Japan Patent Office on Nov. 10, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display unit that displays an image;
a support that supports the display unit;
a cover member that is disposed with a gap between the cover member and the display unit and covers the display unit; and
a first interposition member that is interposed between the support and the cover member, and is directly in contact with the support and the cover member, wherein
the first interposition member has elasticity and thermal conductance, wherein:
a second interposition member that is interposed between the support and the cover member, and is in contact with the support and the cover member,
the display unit includes a display panel that displays the image,
the second interposition member is disposed along a periphery of the display panel,
the first interposition member has a thermal conductivity higher than a thermal conductivity of the second interposition member, and
the first interposition member and the second interposition member are interposed in parallel in a same plane.

2. The display apparatus according to claim 1, wherein the first interposition member has a thermal conductivity indicating a value at which heat is capable of being transferred from the support to the cover member so that a temperature of a back surface of the cover member is higher than a dew point temperature of air being in contact with the back surface of the cover member.

3. The display apparatus according to claim 1, wherein the first interposition member has a thermal conductivity higher than a thermal conductivity of the cover member.

4. The display apparatus according to claim 1, wherein the first interposition member has a thermal conductivity higher than a thermal conductivity of the support.

5. The display apparatus according to claim 1, wherein the first interposition member is positioned further outside than the second interposition member with respect to the display panel.

6. The display apparatus according to claim 1, wherein the first interposition member has a rebound resilience lower than a rebound resilience of the second interposition member.

7. The display apparatus according to claim 1, wherein the display unit includes
a display panel that displays the image,
a light guide that faces the display panel, and
a light source that faces an end surface of the light guide and emits light, wherein
part of the support is positioned between the first interposition member and the light source.

8. The display apparatus according to claim 1, wherein the display unit includes a heat source, and
part of the support is positioned between the first interposition member and the heat source.

9. The display apparatus according to claim 1, wherein the display unit includes a display panel that displays the image,
the first interposition member is disposed along a periphery of the display panel, and
at least part of the first interposition member has the thermal conductance.

* * * * *